United States Patent [19]

Eiland

[11] 4,023,821
[45] May 17, 1977

[54] HEAT SHIELDING FOOT REST FOR ATTACHMENT TO A MOTORCYCLE EXHAUST SYSTEM

[76] Inventor: John H. Eiland, 1611 Ballard St., Silver Spring, Md. 20910

[22] Filed: Apr. 5, 1976

[21] Appl. No.: 673,879

[52] U.S. Cl. .................................. 280/291; 296/75
[51] Int. Cl.² .......................................... B62J 25/00
[58] Field of Search ............ 280/291, 289 G, 163, 280/164, 165, 166, 202; 180/30; 296/75

[56] References Cited

UNITED STATES PATENTS 1,118,679  11/1914  Pawsat ................................. 280/291
3,794,353  2/1974  Oliver ................................... 280/291

FOREIGN PATENTS OR APPLICATIONS 208,245  12/1923  United Kingdom ............... 280/291

*Primary Examiner*—Joseph F. Peters, Jr.
*Assistant Examiner*—Terrance L. Siemens
*Attorney, Agent, or Firm*—Sherman & Shalloway

[57] ABSTRACT

A foot rest is provided for attachment to the exhaust system of a motorcycle engine, in order to protect the heel of a passenger's shoe from heat emitted laterally through the exhaust system. The foot rest consists of a plate having a flat top portion, upon which the passenger's heel resets; a pair of flanges, which engage the outer surface of the exhaust system to hold the top portion in spaced relation thereto, and an adjustable band clamp, which fits around the exhaust system to hold the foot rest in place.

10 Claims, 4 Drawing Figures

HEAT SHIELDING FOOT REST FOR ATTACHMENT TO A MOTORCYCLE EXHAUST SYSTEM

BACKGROUND OF THE INVENTION

1. Field of the Invention

This invention relates to foot rests for attachment to motorcycles and, more particularly, this invention relates to foot rests for motorcycles which limit heat transfer from motorcycle exhaust systems to the shoe and foot of a passenger.

2. Technical Considerations and Prior Art

Motorcycles are usually provided with pegs for supporting the feet of passengers. Usually, the passenger rests the sole of his shoe on the peg, and his heel comes to rest on the exhaust system, which extends back along on the motorcycle frame from the engine. Since the exhaust system is hot, heat is conducted from the exhaust system to the heel of the passenger's shoe. This heat is often sufficiently high to melt rubber heels, can also cause considerable discomfort to the passenger's feet.

The public, of course, is aware of this problem and, at least, one foot rest is currently on the market for alleviating the problem. However, this foot rest is so expensive that many motorcyclists would rather let their passenger's heels melt than undergo the expense of correcting the problem. This expense is due, in part, to a dearth of competing products and, in part, to the fact that the currently available product does not combine heat transfer phenomenon and structural design, in such a way as to minimize cost.

OBJECTS OF THE INVENTION

In view of the aforementioned and other considerations, it is an object of the instant invention to provide a new and improved foot rest for motorcycles.

It is an additional object of the instant invention to provide a new and improved foot rest for protecting a motorcycle passenger's foot and the heel of his shoe from heat emitted from a motorcycle exhaust, while allowing the passenger to use the exhaust system structure to support the heel of his foot.

It is still another object of the instant invention to provide a new and improved foot rest, which accomplishes the aforementioned objects and yet is inexpensive, easy to manufacture and may be easily attached by a motorcyclist.

SUMMARY OF THE INVENTION

In view of these and other objects the instant invention contemplates a foot rest for attachment to the exhaust system of a motorcycle to protect a passenger's foot and the heel of his shoe from heat emitted laterally through the wall of the exhaust system. The foot rest includes a plate, means for spacing the plate from the exhaust system and means for clamping the plate on the exhaust system.

DETAILED DESCRIPTION

Figure 1:
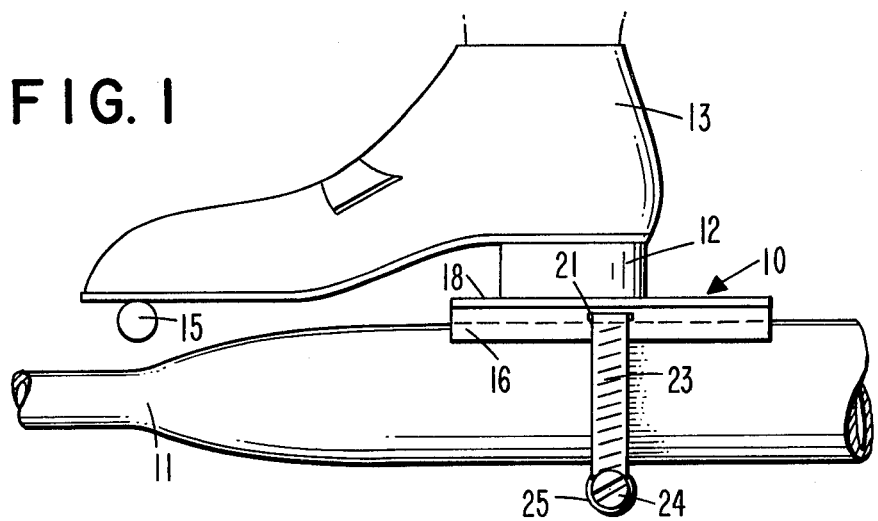
FIG. 1 is a side view in perspective showing the foot rest attachment of the instant invention installed on a motorcycle muffler.
Figure 2:
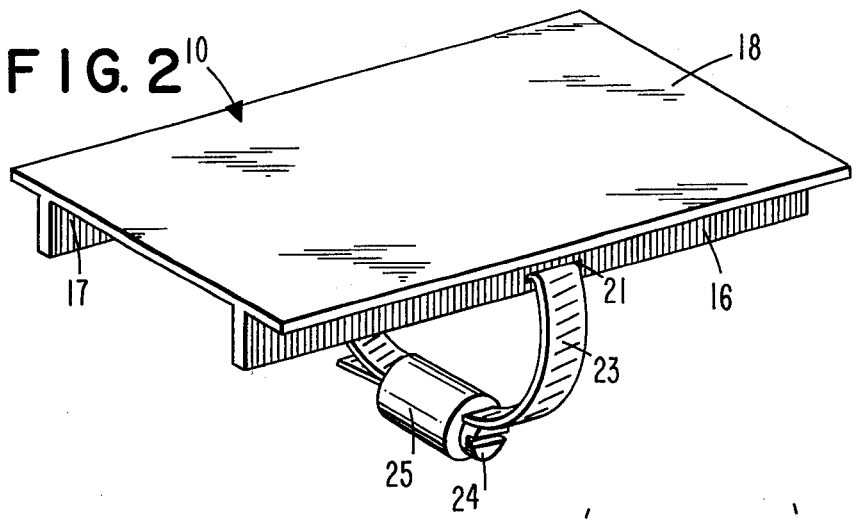
FIG. 2 is a perspective view of the foot rest attachment, according to the instant invention.
Figure 4:
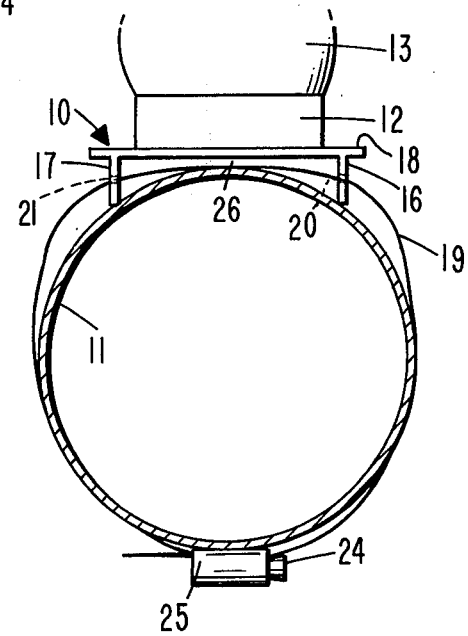
FIG. 4 is an end view of the foot rest showing the foot rest in place on an exhaust system of a motorcycle.

A foot rest attachment 10, according to the instant invention, is conveniently fitted to an exhaust system 11 of a motorcycle, in the manner shown in FIGS. 1 and 4. The purpose of the foot rest attachment 10 is to prevent excessive heat transfer from the exhaust system 11 to the heel 12 of the passenger's shoe 13. As is seen in FIG. 1, the sole 14 of the passenger shoe 13 rests on a peg 15, which projects from the motorcycle frame. Since the exhaust system 11 extends directly beneath the peg 15, the passenger has a tendency to rest his heel on the system or the muffler portion of the system. It has been found that, when the passenger's heel 12 is in direct contact with the exhaust system, the heat emitted laterally from the system can melt or otherwise damage the heel, and can also cause discomfort to the passenger's foot. Heat is transferred laterally from the exhaust system 11 by both radiation and conduction. The attachment 10 of the instant invention effectively blocks both types of heat transfer.

As is seen in the figures, the attachment 10 is in the form of a plate with a top portion 18, upon which the pasenger's foot rests, and a pair of side flanges 16 and 17 which support the top portion 18 in spaced relation to the exhaust system 11. The side flanges 16 and 17 engage the exhaust system 11 along a pair of spaced lines, so that the attachment 10 straddles the exhaust system, and can be stably mounted thereon.

Figure 3:
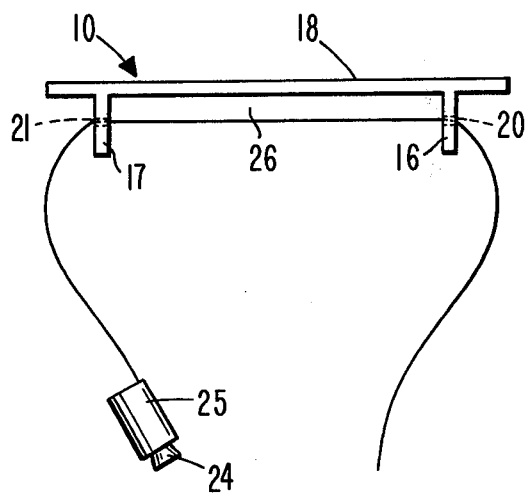
FIG. 3 is an end view of the foot rest attachment of FIG. 2 showing a clamp utilized with the foot rest in an open condition.

A band-type clamp 19 preferably similar to a hose clamp 19 or the like, is received through a pair of slots 20 and 21 in the flanges 16 and 17, respectively. The clamp 19 has a series of slots 23 therein, which are engaged by the thread of a screw 24 that is mounted in a journal 25 attached to one end of the clamp. As the screw 24 is turned in a first direction, it advances one end of the clamp 19 through the journal 25 to draw the clamp together and around the exhaust system 11, as is shown in FIG. 4. Prior to mounting the foot rest attachment 10, the clamp 19 is open, as is shown in FIG. 3. While the clamp in the illustrated embodiment is circular, when closed, and extends between the flanges 16 and 17, the clamp may also be attached at the slots 20 and 21 in a convenient manner, so as to not extend between the flanges.

As is seen in FIG. 4, there is a gap 26 between the top portion 18 of the attachment 10 and the exhaust system 11, through which air passes as the motorcycle moves to limit heat transfer by convection from the exhaust system to the attachment. Since the only engagement between the attachment 10 and exhaust system 11 is along the lines of contact between the flanges 16 and 17 and the exhaust system, heat transferred by conduction is also drastically limited. Furthermore, the flanges 16 and 17 function, in effect, as fins so that the temperature at the junctions between the flanges 16 and 17 and the top portion 18 is considerably less than at the lines of contact between the flanges and exhaust system 11.

Although other metals may be used, it is preferred to make the attachment 10 of an aluminum extrusion. This avoids corrosion problems and keeps costs low. Aluminum rapidly dissipates heat and will reflect much of the heat transferred thereto by radiation. Consequently, it is a most desirable material from which to make the attachment.

The aforedescribed embodiment is merely illustrative of the invention, which should be limited only by the following claims:

What is claimed is:

1. An attachment for protecting the heel of a motorcycle passenger's shoe, wherein the attachment is secured to an exhaust system of a motorcycle, and functions in combination with a support, upon which the sole of the passenger's shoe rests in order to support the passenger's foot, said attachment comprising:

a plate upon which the passenger's heel rests;

means for retaining said plate on the exhaust system; and spacing means for maintaining a spaced relation between said plate and the exhaust system to discourage heat transfer between the exhaust system and plate.

2. The attachment of claim 1, wherein the plate is flat.

3. The attachment of claim 1, wherein the plate is made of aluminum.

4. The attachment of claim 1, wherein said retaining means is a band-type clamp, which fits around the exhaust system and is adjustable to accommodate exhaust systems of different diameters.

5. The attachment of claim 1, wherein said spacing means includes a pair of rib members, which are spaced apart and have parallel engaging portions, which engage the exhaust system to hold the plate spaced from the system, and wherein said parallel portions cooperate with the surface of the exhaust system and with said retaining means to secure the attachment stably on the exhaust system.

6. The attachment of claim 5, wherein the retaining means is a band-type clamp.

7. The attachment of claim 1, wherein the spacing means are a pair of spaced parallel ribs extending down from and adjacent to opposite sides of said plate, and wherein said spaced ribs cooperate with the surface of the exhaust system and with said retaining means to secure the attachment stably to the exhaust system.

8. The attachment of claim 7, wherein the retaining means is a band-type clamp.

9. The attachment of claim 8, wherein the ribs and plate are made of aluminum and formed in a single extrusion.

10. The attachment of claim 8, wherein the band-type clamp passes through slots in the ribs, and wherein the clamp includes screw means, which engage slots in the clamp in order to close the clamp by advancing one portion of the clamp through the screw means.

* * * * *